US 9,819,235 B2

(12) United States Patent
Taniguchi

(10) Patent No.: US 9,819,235 B2
(45) Date of Patent: Nov. 14, 2017

(54) ROTATOR OF ROTATIONAL ELECTRIC MACHINE

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 14/549,607

(22) Filed: Nov. 21, 2014

(65) Prior Publication Data

US 2015/0145370 A1 May 28, 2015

(30) Foreign Application Priority Data

Nov. 22, 2013 (JP) .................................. 2013-241695

(51) Int. Cl.
*H02K 1/27* (2006.01)
*B62D 5/04* (2006.01)
*H02K 29/03* (2006.01)

(52) U.S. Cl.
CPC ........... *H02K 1/278* (2013.01); *B62D 5/0403* (2013.01); *H02K 29/03* (2013.01)

(58) Field of Classification Search
CPC ............ H02K 1/27; H02K 1/28; H02K 15/03; H02K 29/03; B62D 5/04; B62D 5/0403; H01F 41/0253
See application file for complete search history.

(56) References Cited

U.S. PATENT DOCUMENTS

| 4,674,178 A * | 6/1987 | Patel ...................... H02K 1/278 29/598 |
| 5,099,158 A * | 3/1992 | Stuart ................ B60G 17/0157 310/14 |
| 5,175,461 A * | 12/1992 | Zigler ................. H01F 41/0253 310/156.28 |
| 6,803,690 B2 * | 10/2004 | Bosch .................. H02K 1/2726 310/154.21 |

(Continued)

FOREIGN PATENT DOCUMENTS

| EP | 0 392 028 | 10/1990 |
| JP | 61-147584 | 9/1986 |
| JP | 2012-249354 | 12/2012 |

OTHER PUBLICATIONS

Office Action (2 pages) dated Aug. 17, 2015, issued in corresponding Japanese Application No. 2013-241695 and English translation (3 pages).

*Primary Examiner* — Tran Nguyen
(74) *Attorney, Agent, or Firm* — Nixon & Vanderhye PC

(57) ABSTRACT

A rotor core has a regular decagon base portion in its cross section relative to a shaft center and ten convex portions each of which is located between each angle of the regular decagon base portion. Each convex portion has a first convex curve having a single curvature radius. Each permanent magnet is a curved plate and has a concave curve and a second convex curve. Each permanent magnet is provided so that the concave curve adheres on the first convex curve. When each permanent magnet moves in circumferential direction relative to the rotor core, the concave curve slides on the first convex curve of the rotor core. A position of the smallest gap clearance between the second convex curve and the stator does not change. A magnetic-flux-strength maximum position is not changed easily.

5 Claims, 5 Drawing Sheets

(56) References Cited

U.S. PATENT DOCUMENTS

| | | | |
|---|---|---|---|
| 6,858,960 B1* | 2/2005 | Muszynski | H02K 29/03 310/156.38 |
| 7,408,279 B2* | 8/2008 | Murakami | H02K 21/16 310/156.28 |
| 2002/0079770 A1* | 6/2002 | Lai | H02K 1/278 310/156.28 |
| 2006/0131976 A1* | 6/2006 | Kikuchi | H02K 1/276 310/156.46 |
| 2009/0315424 A1* | 12/2009 | Vollmer | H02K 1/278 310/156.43 |
| 2010/0176680 A1 | 7/2010 | Murakami et al. | |

* cited by examiner

FIG. 4

DETECT CURRENT → dq-TRANSFORMATION → COMPUTE CURRENT FEED BACK → dq-INVERSE TRANSFORMATION → OUTPUT COMMAND VOLTAGE

FIG. 5

| dq-TRANSFORMATION | $\begin{pmatrix} id \\ iq \end{pmatrix} = \begin{pmatrix} \cos\theta & -\sin\theta \\ \sin\theta & \cos\theta \end{pmatrix} \cdot \begin{pmatrix} 1 & -0.5 & -0.5 \\ 0 & 0.866 & -0.866 \end{pmatrix} \cdot \begin{pmatrix} iu \\ iv \\ iw \end{pmatrix}$ |
|---|---|
| dq-INVERSE TRANSFORMATION | $\begin{pmatrix} iu \\ iv \\ iw \end{pmatrix} = \begin{pmatrix} 1 & -0.5 & -0.5 \\ 0 & 0.866 & -0.866 \end{pmatrix}^{-1} \cdot \begin{pmatrix} \cos\theta & -\sin\theta \\ \sin\theta & \cos\theta \end{pmatrix}^{-1} \cdot \begin{pmatrix} id \\ iq \end{pmatrix}$ |

FIG. 6

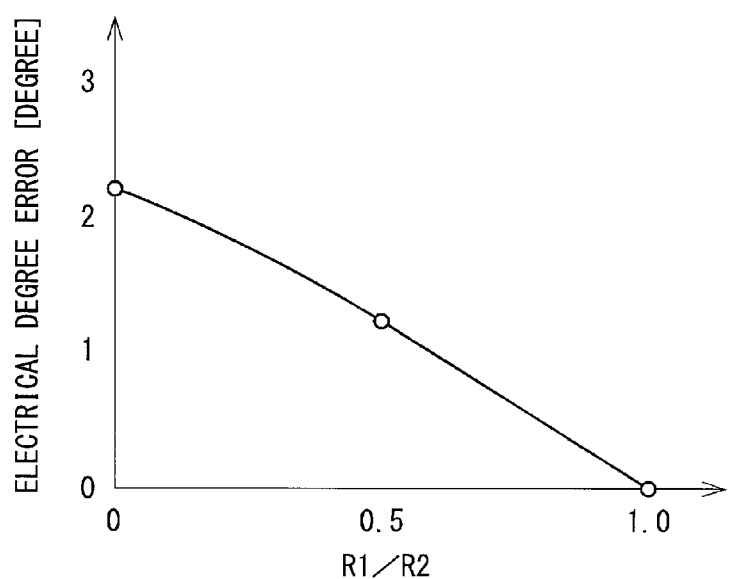

ROTATOR OF ROTATIONAL ELECTRIC MACHINE

CROSS-REFERENCE TO RELATED APPLICATION

This application is based on Japanese Patent Application No. 2013-241695 filed on Nov. 22, 2013, the disclosure of which is incorporated herein by reference.

TECHNICAL FIELD

The present disclosure relates to a rotator of a rotational electric machine.

BACKGROUND

In a technical field of a rotational electric machine, it is required to reduce amount of the rare materials which forms a permanent magnet. Generally, the rotator has a ring-shaped permanent magnet. In order to reduce the amount of the permanent magnet, it can be configured that a plurality of permanent magnets are arranged circumferentially. Compared with the ring-shaped permanent, the amount of the permanent magnet can be reduced.

When multiple permanent magnets are arranged circumferentially, it is important to fix each permanent magnet on an iron core properly. For example, JP-2012-249354A describes that a flat surface of the permanent magnet is fixed on a flat surface of the iron core. A protrusion of the iron core is engaged with a groove of the permanent magnet.

However, in JP-2012-249354A, a gap clearance is necessary between the protrusion of the iron core and the permanent magnet to engage them. Thus, when assembling the permanent magnet to the iron core, it is likely that the permanent magnet moves in the groove relative to the iron core.

If the permanent magnet moves, a magnetic-flux-strength maximum position also deviates in a circumferential direction. The deviation of the magnetic-flux-strength maximum position causes an increase of a cogging torque and a torque ripple.

Moreover, when the magnetic-flux-strength maximum position deviates, the d-axis also deviates in performing a dq-transformation. As the result, controllability is deteriorated and a vibration is caused.

SUMMARY

It is an object of the present disclosure to provide a rotator of a rotational electric machine, which is capable of restricting an increase of a cogging torque and a torque ripple, and a deterioration of controllability.

According to a present disclosure, a rotator of a rotational electric machine has an iron core and a plurality of permanent magnets. In a cross section relative to a shaft center, the iron core includes a polygonal base portion having multiple sides of which number is twice of an integer "p", and (2×p) pieces of convex portions. Each of the convex portions includes a first convex curve having a single curvature radius. The permanent magnet includes a concave curve adhering on the first convex curve and a second convex curve located on an opposite side relative to the first convex curve. Each permanent magnet is provided so that the concave curve adheres on the first convex curve.

According to the above configuration, when each permanent magnet is engaged with the iron core and moves in circumferential direction relative to the iron core, the concave curve slides on the first convex curve of the iron core. At this time, the position of the smallest gap clearance between the second convex curve and the stator does not change. Especially, in a case that the curvature radius of the first convex curve is equal to the curvature radius of the second convex curve, the position of the smallest gap clearance between the second convex curve and the stator does not change even when the permanent magnet moves relative to the iron core. Therefore, according to the present disclosure, the deviation of the magnetic-flux-strength maximum position in the clearance gap between the rotator and the stator can be restricted as much as possible. It is also avoided that the cogging torque and the torque ripple are increased and a controllability of the rotational electric machine is deteriorated.

BRIEF DESCRIPTION OF THE DRAWINGS

The above and other objects, features and advantages of the present disclosure will become more apparent from the following detailed description made with reference to the accompanying drawings. In the drawings:

FIG. 4 is a chart showing a general control block diagram of a three-phase circuit brush-less motor;

FIG. 5 is a chart showing computing formulas in a dq-transformation and a dq-inverse transformation;

FIG. 6 is a graph showing a relation between a curvature-radius ratio and an electrical degree error.

DETAILED DESCRIPTION

Embodiments of the present disclosure will be described hereinafter.

First Embodiment

Figure 1:
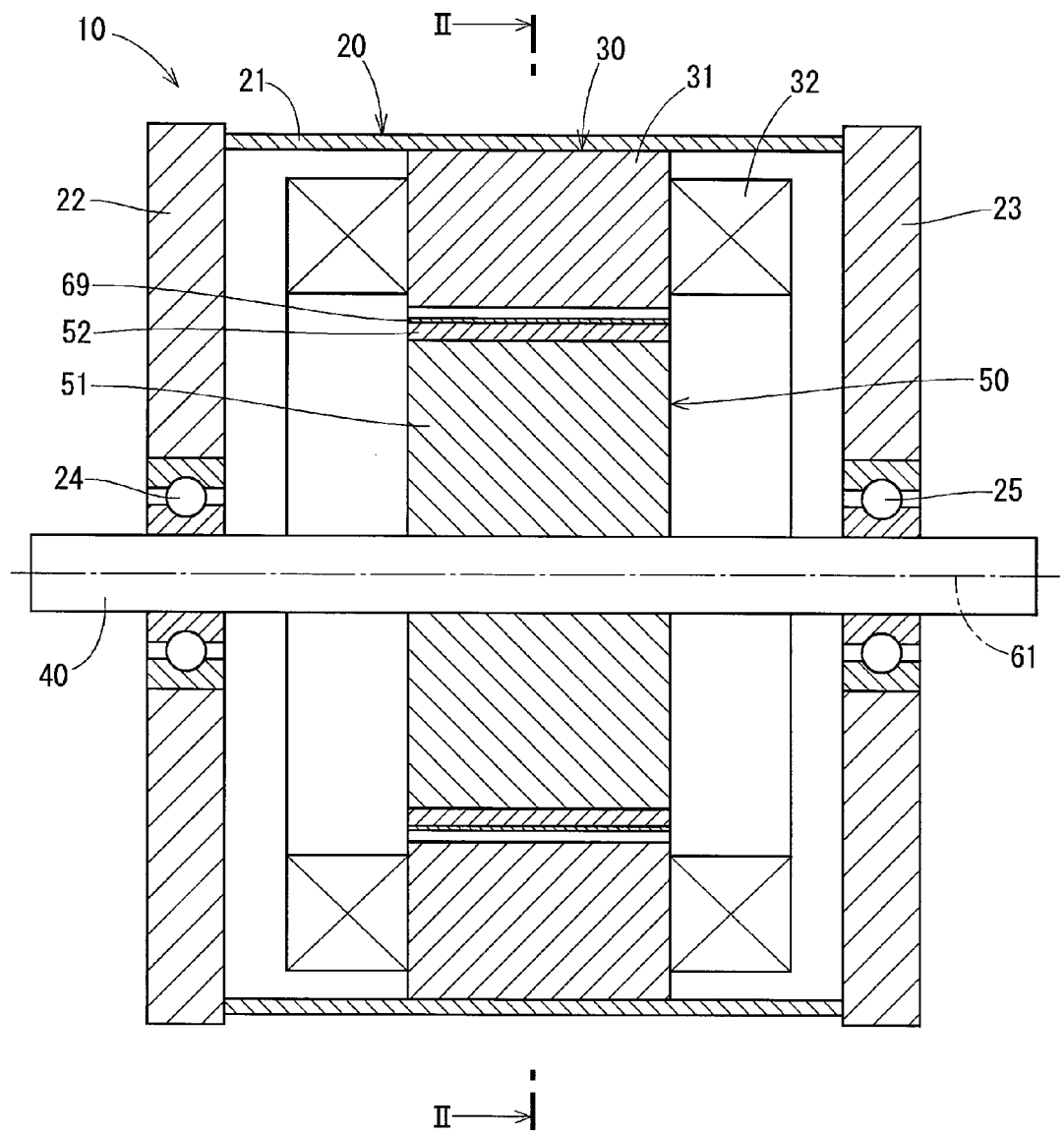
FIG. 1 is a cross-sectional view showing a motor having a rotator according to an embodiment.

FIG. 1 shows a rotator applied to a motor 10 as a rotational electric machine. The motor 10 is used as a driving force source of an electric power-steering device for a vehicle.

(Entire Configuration)

First, an entire configuration of the motor 10 will be explained with reference to FIGS. 1 and 2. The motor 10 is a three-phase circuit brush-less motor. The motor 10 has a housing 20, a stator 30, a shaft 40, and a rotator 50. The housing 20 has a cylinder case 21, a first cover 22 closing one end of the cylinder case 21, and a second cover 23 closing the other end of the cylinder case 21. Each of the first cover 22 and the second cover 23 has a bearing 24, 25 at its center portion.

The stator 30 is an armature of the motor 10 and has a stator core 31 and a winding 32. The stator core 31 forms a cylindrical yoke 33 which is fixed on an inner wall of the cylinder case 21, and multiple teeth 34 radially inwardly extending from the yoke 33. The winding 32 is inserted in each slot and forms a U-phase winding, a V-phase winding, and a W-phase winding. It should be noted that the winding 32 is not illustrated in FIG. 2.

The shaft 40 is supported by the bearings 24, 25. The rotator 50 has a rotor core 51 and multiple permanent magnets 52. The rotor core 51 is a cylindrical member fixed on the shaft 40 inside of the stator 30. The rotor core 51 corresponds to an iron core. The permanent magnets 52 are arranged on an external wall surface of the rotor core 51 at regular intervals. Radially outer portions of each adjacent two permanent magnets 52 have different magnetic poles mutually.

The U-phase winding, the V-phase winding, and the W-phase winding are sequentially energized to generate a rotating field, whereby the rotator 50 rotates along with the shaft 40.

(Configuration of Rotator)

Figure 2:
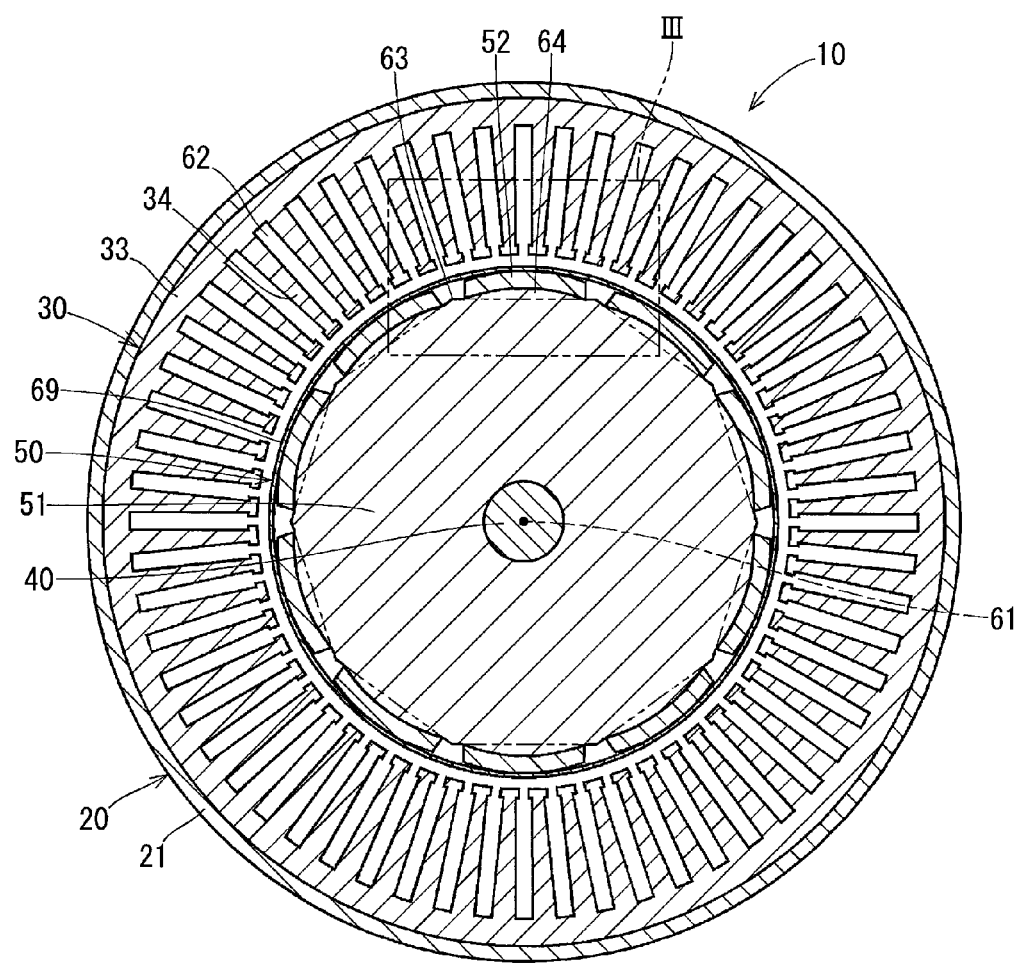
FIG. 2 is a cross-sectional view taken along a line II-II in FIG. 1.
Figure 3:
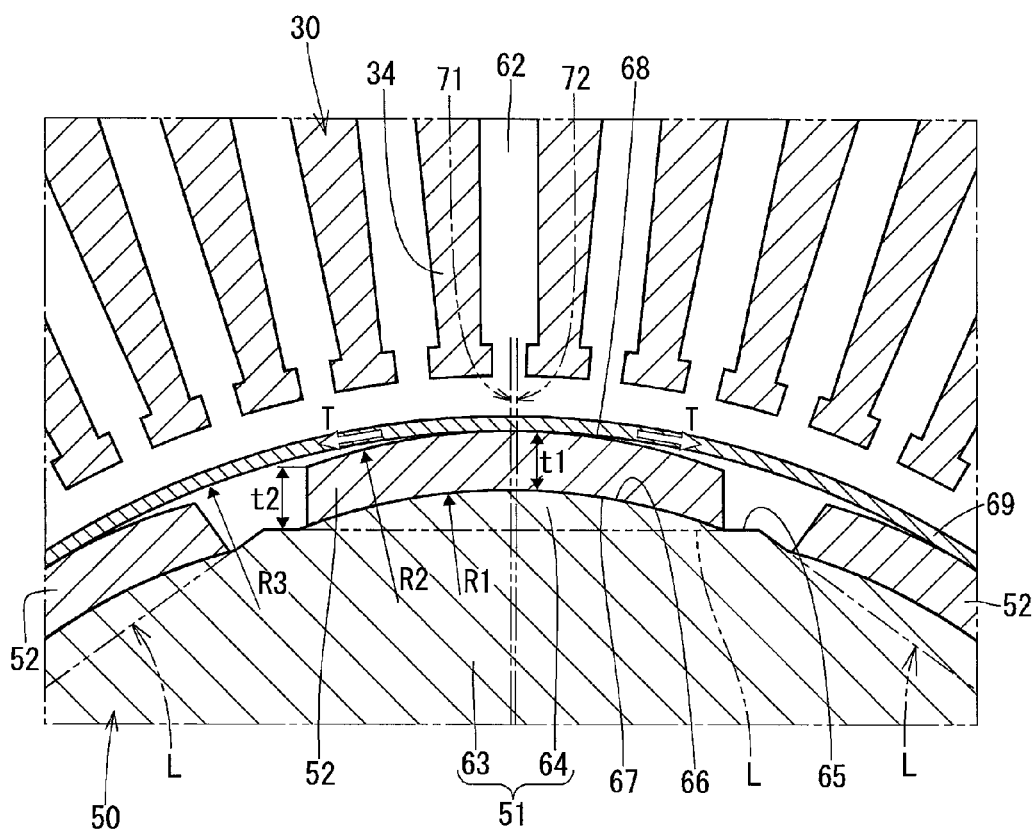
FIG. 3 is an enlarged view of part III in FIG. 2.

Referring to FIGS. 2 and 3, the configuration of the rotator 50 will be explained in detail. As shown in FIG. 2, an outer diameter of the rotator 50 is 53 mm and the number of the permanent magnets 52 is twice the number of the integer "p". In the present embodiment, "p" is five, and ten permanent magnets 52 are provided. The rotor core 51 has a cross-section of regular decagon relative to a shaft center 61, as shown by two-dot chain line. The stator 30 has sixty slots 62.

As shown in FIGS. 2 and 3, the rotor core 51 has a base portion 63 and ten convex portions 64. The cross-section of the base portion 63 is regular decagon. Each convex portion 64 is positioned between the adjacent angle portions of the base portion 63. That is, each convex portion 64 is located on each side of the base portion 63 of regular decagon. Each convex portion 64 has a first convex curve 66 of a single curvature radius.

As shown in an FIG. 3, in a cross section which perpendicularly intersects the shaft center 61, both ends of the first convex curve 66 are located on the side 65 of the base portion 63. In the cross section which perpendicularly intersects the shaft center 61, a length of an imaginary straight line "L" connecting both ends of the first convex curve 66 is not less than 70% of a length of the side 65 of the base portion 63.

Each permanent magnet 52 is a curved plate and has a concave curve 67 and a second convex curve 68. The concave curve 67 is a curved surface along the first convex curve 66 of the rotor core 51. The second convex curve 68 has a single curvature radius. The concave curve 67 and the first convex curve 66 have the same curvature radius. Each permanent magnet 52 is provided so that the concave curve 67 adheres on the first convex curve 66.

In the cross section which perpendicularly intersects the shaft center 61, a width of the permanent magnet 52 is slightly smaller than that of the convex portion 64 of the rotor core 51. Thereby, when each permanent magnet 52 is engaged with the rotor core 51, the concave curve 67 of the permanent magnet 52 is certainly adheres on the first convex curve 66 of the convex portion 64 of the rotor core 51. Moreover, when each permanent magnet 52 moves in circumferential direction relative to the rotor core 51 with a contact between the concave curve 67 and the first convex curve 66, the concave curve 67 slides on the first convex curve 66 of the rotor core 51. This slide of the permanent magnet 52 is restricted when the permanent magnet 52 is brought into contact with the side 65 of the base portion 63.

The curvature radius of the first convex curve 66 is defined as "R1", the curvature radius of the second convex curve 68 is defined as "R2", and a curvature radius of an imaginary circumscribed circle circumscribed to each permanent magnet 52 is defined as "R3". In the present embodiment, the above-mentioned imaginary circumscribed circle corresponds to an inner wall of a cylindrical cover 69 which will be described later. The rotor core 51 and each permanent magnet 52 are formed in such a manner as satisfy following formulas (1) and (2).

$$0.6 \leq (R2/R1) \leq 1.0 \quad (1)$$

$$R2 \leq R3 \quad (2)$$

In the present embodiment, both the curvature radius R1 and R2 are 18 mm.

$$(R2/R1)=1.0$$

$$R2<R3$$

In the cross section which perpendicularly intersects the shaft center 61, a thickness of a center portion of the permanent magnet 52 is defined as "t1" and a thickness of both end portions of the permanent magnet 52 is defined as "t2". The thickness "t1" is the maximum thickness of the permanent magnet 52. Further, each permanent magnet 52 is formed in such a manner as to satisfy a following formula (3).

$$1.0 \leq (t1/t2) \leq 1.4 \quad (3)$$

In the present embodiment, the thickness "t1" is equal to the thickness "t2".

$$(t1/t2)=1.0$$

The rotator 50 further has the cylindrical cover 69 engaged with the outer surface of the permanent magnet 52 so that at least a center portion of the second convex curves 68 adheres on an inner surface of the cylindrical cover 69. The cylindrical cover 69 is made from nonmagnetic materials, such as stainless steel. As shown in FIG. 3, the tension "T" is applied to the cylindrical cover 69 in two directions with respect to a contacting portion between the permanent magnet 52 and the cylindrical cover 69. The tension "T" biases each permanent magnet 52 toward the first convex curve 66 of the rotor core 51.

Comparison with Comparative Example

Figure 7:
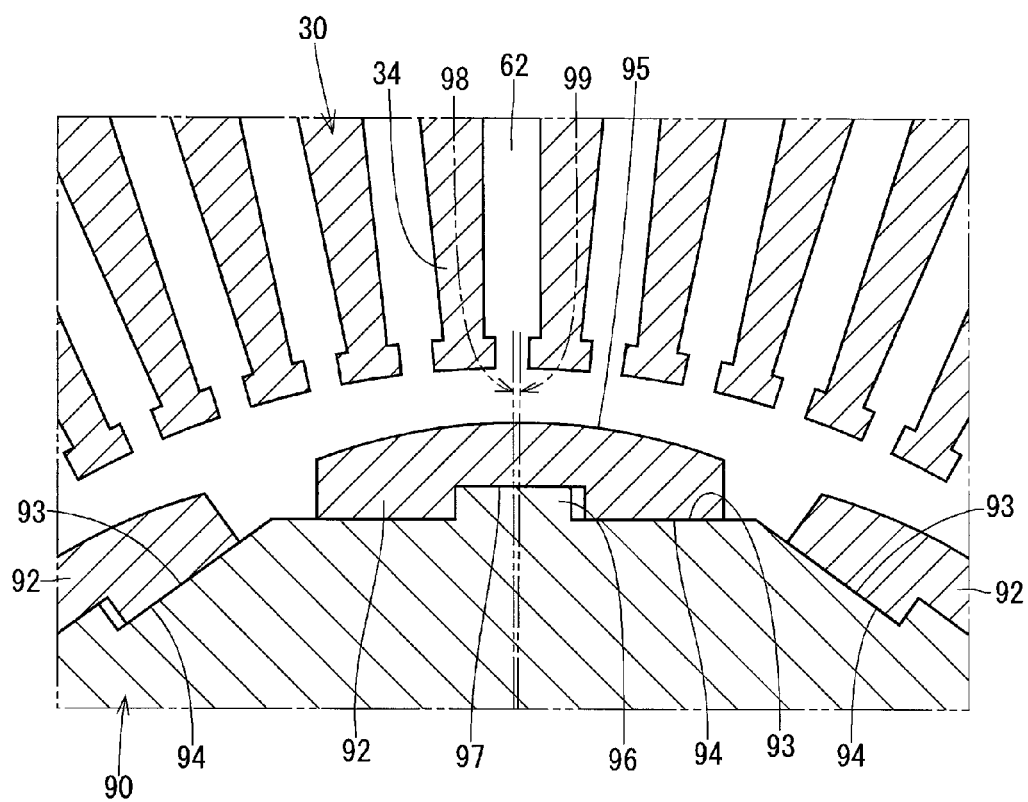
FIG. 7 is an enlarger view showing a rotator of a comparative example.

FIG. 7 shows a comparative example.

In the comparative example, an outer diameter of the rotator 90 is 53 mm. The rotator 90 has a rotor core 91 and ten permanent magnets 92. The rotor core 91 has ten flat surfaces 93 on its outer surface. Each permanent magnet 92 has a flat surface 94 which adheres on the flat surface 93 of the rotor core 91, and a convex curve 95 of which curvature radius is 18 mm. In the comparative example, a protrusion 96 is engaged with a groove 97 of the permanent magnet 92. The protrusion 96 extends from the flat surface 93 of the rotor core 91.

A gap clearance is defined in width direction between the protrusion 96 and the groove 97 in order to engage the protrusion 96 with the groove 97. Thus, when assembling the permanent magnet 92 to the rotor core 91, it is likely that the permanent magnet 92 moves in the groove 97 relative to the rotor core 91. In FIG. 7, an imaginary line 98 shown by a two-dot chain line is a straight line which connects a shaft center and the center of the protrusion 96, and an imaginary line 99 is a straight line which connects a shaft center and the center of the convex curve 95. When the permanent magnet 92 moves 0.2 mm, a magnetic-flux-strength maximum position in the above gap clearance is positioned on the imaginary line 99, which deviates about 26 minutes around the shaft center 61. The angle 26 minutes corresponds to 2 degrees 10 minutes of the electrical degree in a five-pole motor.

The deviation of the magnetic-flux-strength maximum position causes an increase of a torque ripple. FIG. 4 is a chart showing a general control block diagram of a three-phase circuit brush-less motor. According to the general control, angle errors are generated twice in a transformation from three-phase actual axis to dq-axis and an inverse transformation from dq-axis to three-phase actual axis. FIG. 5 is a chart showing a transformation formula and an inverse transformation formula. In these formulas, θ represents a moved angle of the rotator from the d-axis. The deviation of the magnetic-flux-strength maximum position corresponds to a deviation of the d-axis. It should be noted that the angle error is not corrected by performing the transformation and the inverse transformation. In performing the inverse transformation, the angle error may be increased due to a hysteresis.

On the other hand, according to the present embodiment, a contacting surface between the rotor core 51 and the permanent magnet 52 is a curved surface. When each permanent magnet 52 is engaged with the rotor core 51 and moves in circumferential direction relative to the rotor core 51, the concave curve 67 slides on the first convex curve 66 of the rotor core 51. Since the curvature radius R1 of the first convex curve 66 is equal to the curvature radius R2 of the second convex curve 68, the position of the smallest gap clearance between the second convex curve 68 and the stator 30 does not change even when the permanent magnet 52 moves. That is, according to the present embodiment, even if the permanent magnet 52 moves in a circumferential direction, the magnetic-flux-strength maximum position does not deviate, unlike the comparative example. In FIG. 3, an imaginary line 71 shown by a two-dot chain line is a straight line which connects a shaft center and the center of the first convex curve 66, and an imaginary line 72 is a straight line which connects a shaft center and the center of the second convex curve 68. The magnetic-flux-strength maximum position is located on the imaginary line 71.

As shown in FIG. 6, the electrical degree error which corresponds to the deviation of the magnetic-flux-strength maximum position becomes zero when the curvature-radius ratio (R2/R1) is 1.0. According the curvature-radius ratio (R2/R1) becomes more close to zero, the electrical degree error becomes larger. The electrical degree error is preferably 1 degree or less. The curvature-radius ratio (R2/R1) is 0.6, and a thickness ratio (t1/t2) is 1.4.

Advantages

As described above, according to the present embodiment, the rotator 50 has a rotor core 51 and multiple permanent magnets 52. The rotor core 51 has the base portion 63 and ten convex portions 64. The cross-section of the base portion 63 is regular decagon. Each convex portion 64 is positioned between the adjacent angle portions of the base portion 63. Each convex portion 64 has the first convex curve 66 of a single curvature radius. Each permanent magnet 52 is a curved plate and has the concave curve 67 and the second convex curve 68. Each permanent magnet 52 is provided so that the concave curve 67 adheres on the first convex curve 66.

According to the above configuration, when each permanent magnet 52 is engaged with the rotor core 51 and moves in circumferential direction relative to the rotor core 51, the concave curve 67 slides on the first convex curve 66 of the rotor core 51. At this time, the position of the smallest gap clearance between the second convex curve 68 and the stator 30 does not change. Especially, in a case that the curvature radius R1 of the first convex curve 66 is equal to the curvature radius R2 of the second convex curve 68, the position of the smallest gap clearance between the second convex curve 68 and the stator 30 does not change even when the permanent magnet 52 moves relative to the rotor core 51. Therefore, according to the present embodiment, the deviation of the magnetic-flux-strength maximum position in the clearance gap between the rotator 50 and the stator 30 can be restricted as much as possible. It is also avoided that the cogging torque and the torque ripple are increased and a controllability of the motor 10 is deteriorated.

In present embodiment, the base of each convex portion 64 is not less than 70% of the length of the side 65 of the base portion 63. Thus, each permanent magnet 52 is accurately fixed, whereby a stable manufacture is attained. Moreover, the width of the permanent magnet 52 is slightly smaller than that of the convex portion 64 of the rotor core 5, whereby the magnetic loading is made proper.

In a cross section which perpendicularly intersects the shaft center 61, both ends of the first convex curve 66 are located on the side 65 of the base portion 63. Therefore, when each permanent magnet 52 moves in circumferential direction relative to the rotor core 51, the movement of the permanent magnet 52 is restricted when the permanent magnet 52 is brought into contact with the side 65 of the base portion 63.

Moreover, in present embodiment, the second convex curve 68 of the permanent magnet 52 is a curved surface having a single curvature radius. The rotator 50 further has the cylindrical cover 69 engaged with the outer surface of the permanent magnet 52 so that at least a center portion of the second convex curves 68 adheres on the inner surface of the cylindrical cover 69. The tension "T" applied to the cylindrical cover 69 biases each permanent magnet 52 toward the first convex curve 66 of the rotor core 51.

In present embodiment, the rotator 50 is used for the motor 10 of the power-steering device for a vehicle. Since the increase in cogging torque and torque ripple is controlled as mentioned above, the present rotator 50 is suitable for a motor 10 of the power-steering device.

Other Embodiments

In another embodiment of the present invention, the base of each convex portion 64 may be less than 70% of the length of the side 65 of the base portion 63. In a cross section which perpendicularly intersects the shaft center 61, both ends of the first convex curve 66 may not be located on the side 65 of the base portion 63. For example, the both ends of the first convex curve 66 may be radially outside of the side 65 of the base portion 63.

The curvature-radius ratio (R2/R1) may be less than 1.0 and more than 0.6. With this arrangement, the electrical degree error can be not greater than 1 degree. The curvature-radius ratio (R2/R1) may be less than 0.6 and more than zero. With this arrangement, although the electrical degree error exceeds 1 degree, the electrical degree error can be less than that of the comparative example. In a cross section which perpendicularly intersects the shaft center 61, the outer shape of the base portion 63 is not limited to regular decagon.

The number of the slots 62 of the stator 30 is not limited to sixty. The permanent magnets 52 may be fixed by adhesive agent. The rotator may be used not only for the motor of the power-steering device for vehicles but also for other rotational electric machines in other technical field.

The present disclosure is not limited to the embodiment mentioned above, and can be applied to various embodiments.

What is claimed is:

1. A rotator of a rotational electric machine, comprising:
an iron core that has a cross section relative to a shaft center and includes:
a polygonal base portion having multiple sides that are even in number, and
convex portions, positioned between angle portions of the polygonal base portion which are adjacent to each other, each of the convex portions including a first convex curve having a single curvature radius; and
a plurality of permanent magnets including a concave curve adhering on the first convex curve and a second convex curve located on an opposite side relative to the first convex curve, wherein
a number of the convex portions is equal to a number of the multiple sides, and
each of the angle portions of the polygonal base portion is convex outwardly in a triangular shape between the adjacent convex portions, wherein
in a cross section perpendicularly intersecting the shaft center, a thickness of a center portion of the permanent magnet is defined as "t1", a thickness of both end portions of the permanent magnet is defined as "t2", and the thickness "t1" and the thickness "t2" satisfy a following formula:

$$1.0 \leq (t1/t2) \leq 1.4$$

and a curvature radius of the first convex curve is defined as "R1", a curvature radius of the second convex curve is defined as "R2", and a curvature radius of an imaginary circumscribed circle circumscribed to each permanent magnet is defined as "R3", and the curvature radius "R1", "R2", "R3" satisfy following formulas:

$$0.6 \leq (R2/R1) \leq 1.0$$

$$R2 \leq R3.$$

2. A rotator according to claim 1, wherein
a base of each convex portion is not less than 70% of a length of a side of the polygonal base portion.

3. A rotator according to claim 1, wherein
in a cross section perpendicularly intersecting the shaft center, both ends of the first convex curve are positioned on a side of the polygonal base portion.

4. A rotator according to claim 1, wherein
the second convex curve is a curved surface having a single curvature radius, further comprising:
a cylindrical cover engaged with an outer surface of the permanent magnet so that at least a center portion of the second convex curves adheres on an inner surface of the cylindrical cover.

5. A rotator according to claim 1, wherein
the rotator is applied to a motor of a power-steering device for a vehicle.

* * * * *